Figure 17:
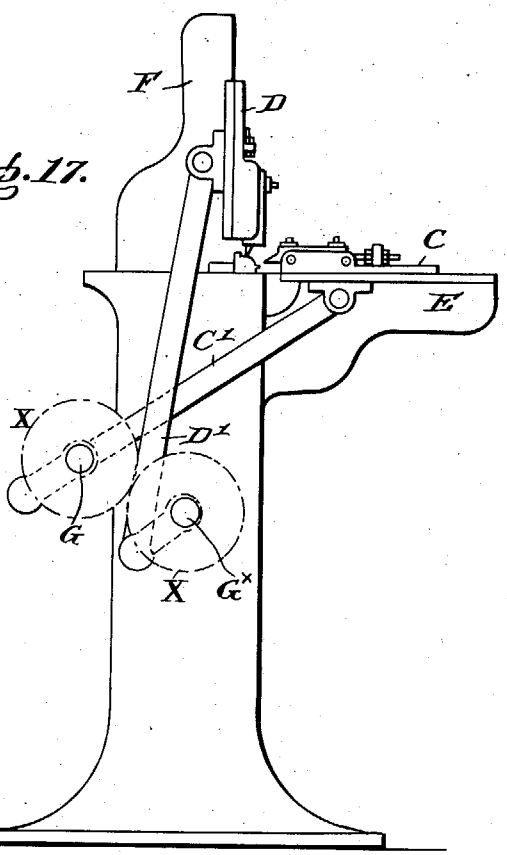

No. 11,839. Reissued July 3, 1900.
H. MARLES.
CARVING MACHINE.
(Application filed Dec. 30, 1899.)
6 Sheets—Sheet 1.
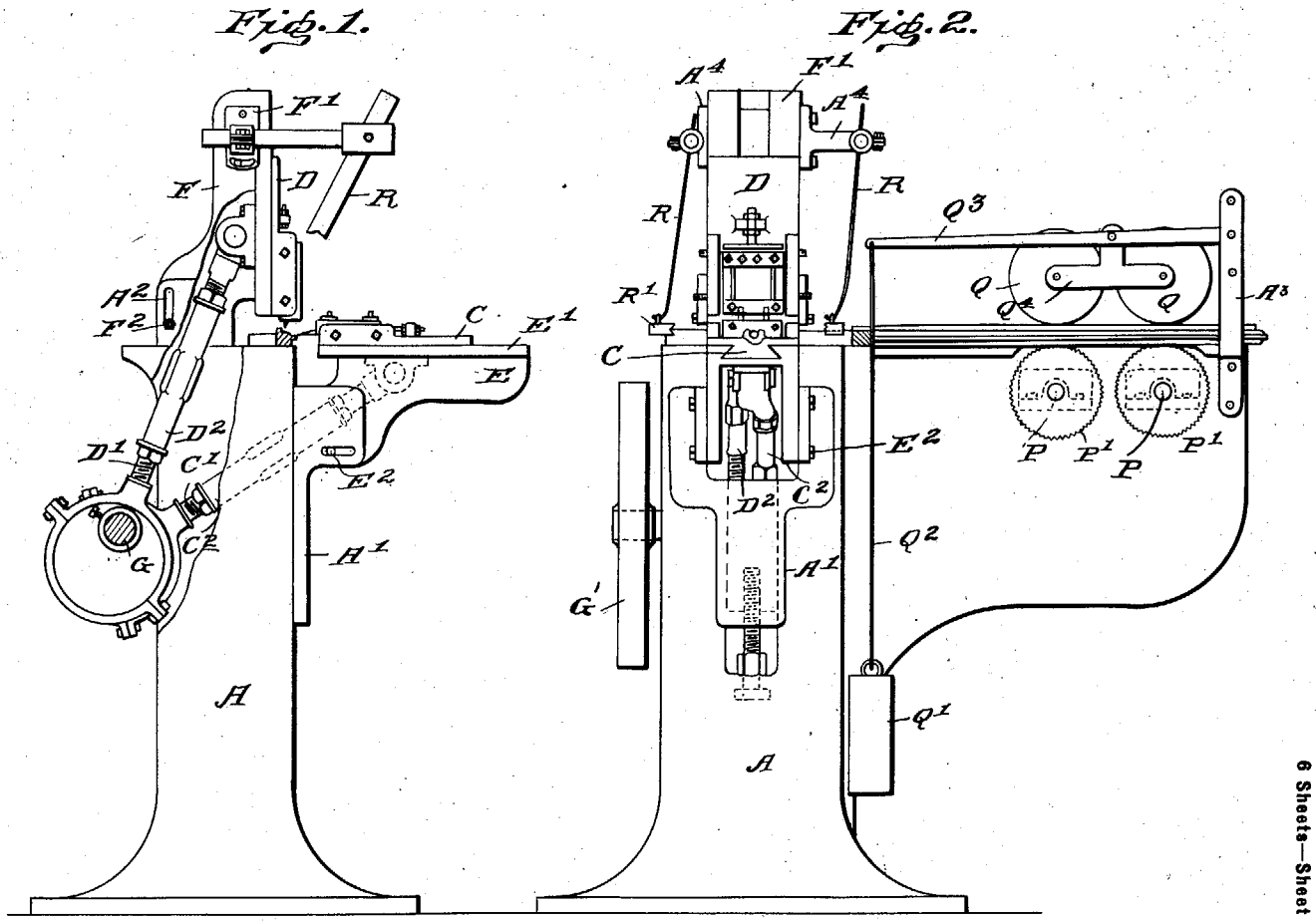
Witnesses:
J. B. Keeler
Bruce D. Everitt.
Inventor
Henry Marles
By James L. Norris
Attorney No. 11,839. Reissued July 3, 1900.
H. MARLES.
CARVING MACHINE.
(Application filed Dec. 30, 1899.)
6 Sheets—Sheet 2.
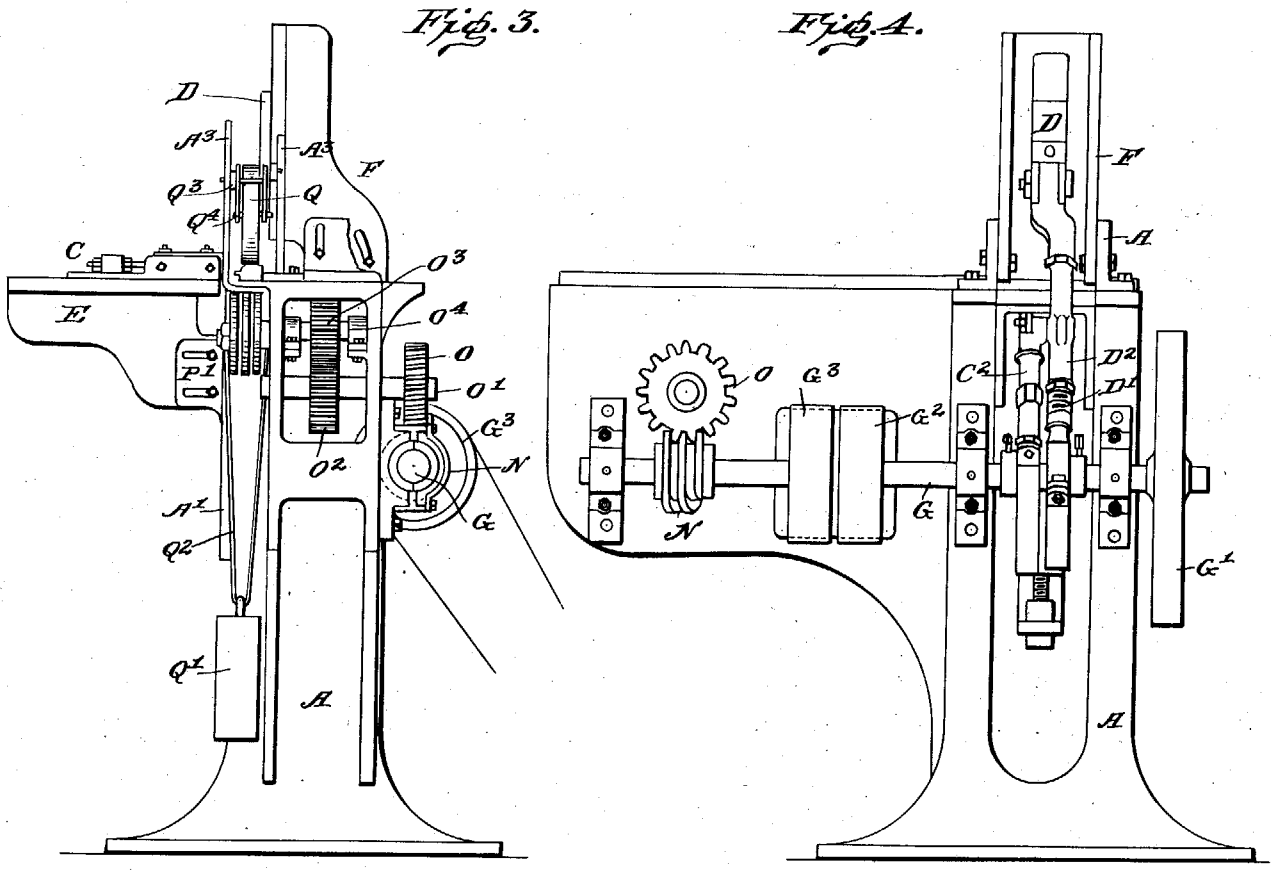
Witnesses:
J. B. Keefer
Bruce D. Elliott.
Inventor
Henry Marles
By James L. Norris
Attorney No. 11,839. Reissued July 3, 1900.
H. MARLES.
CARVING MACHINE.
(Application filed Dec. 30, 1899.)
6 Sheets—Sheet 3.
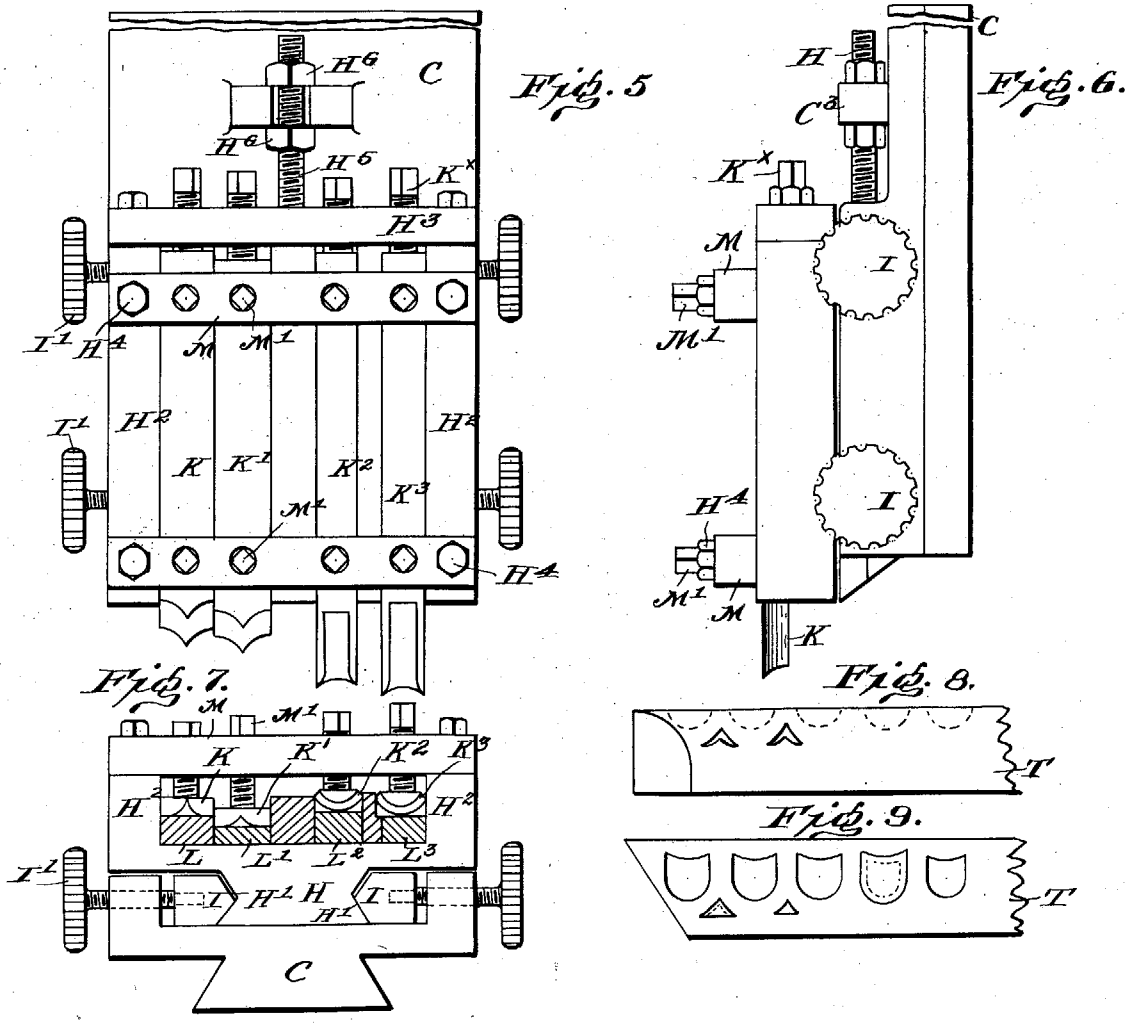
Witnesses:
J. B. Keefer
Bruce S. Elliott.
Inventor
Henry Marles.
By James L. Norris.
Attorney No. 11,839. Reissued July 3, 1900.
H. MARLES.
CARVING MACHINE.
(Application filed Dec. 30, 1899.)
6 Sheets—Sheet 4.
Fig. 12.
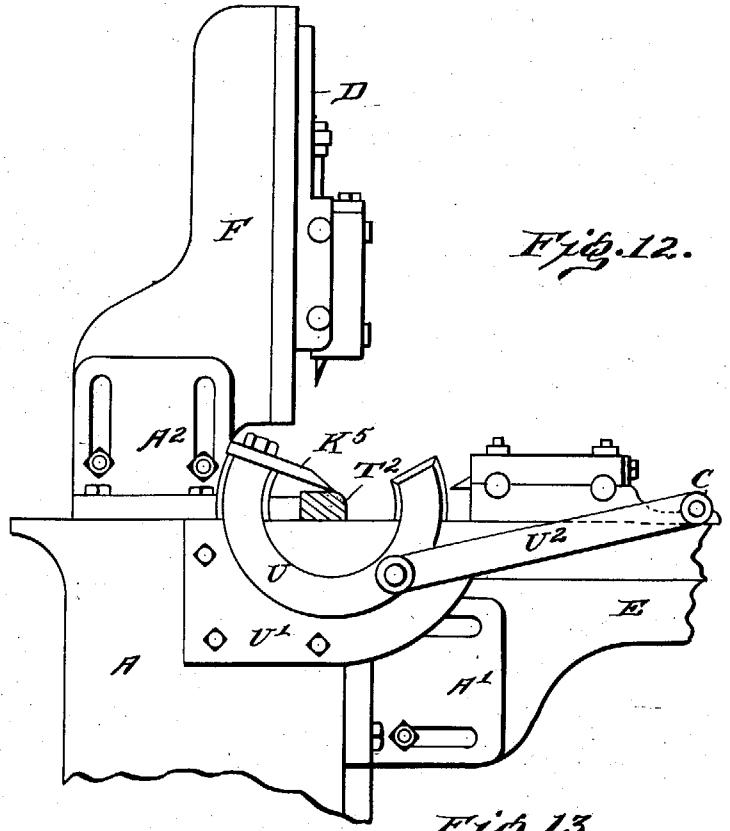
Fig. 13.
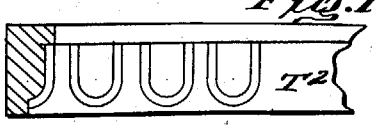
Fig. 10.
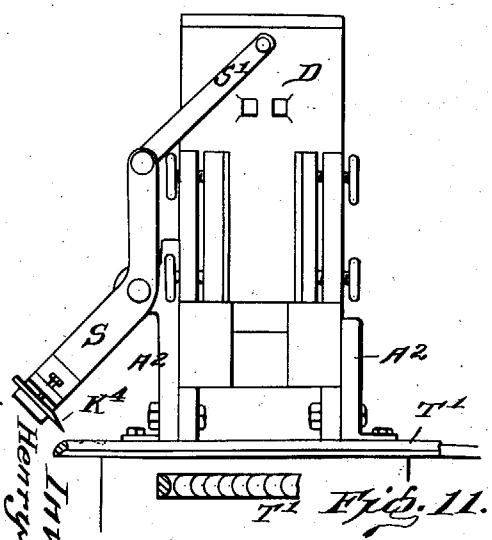
Fig. 11.
Witnesses:
J. B. Keefe
Bruce A. Everett.
Inventor
Henry Marles
By James L. Norris
Attorney No. 11,839. Reissued July 3, 1900.
H. MARLES.
CARVING MACHINE.
(Application filed Dec. 30, 1899.)
6 Sheets—Sheet 5.
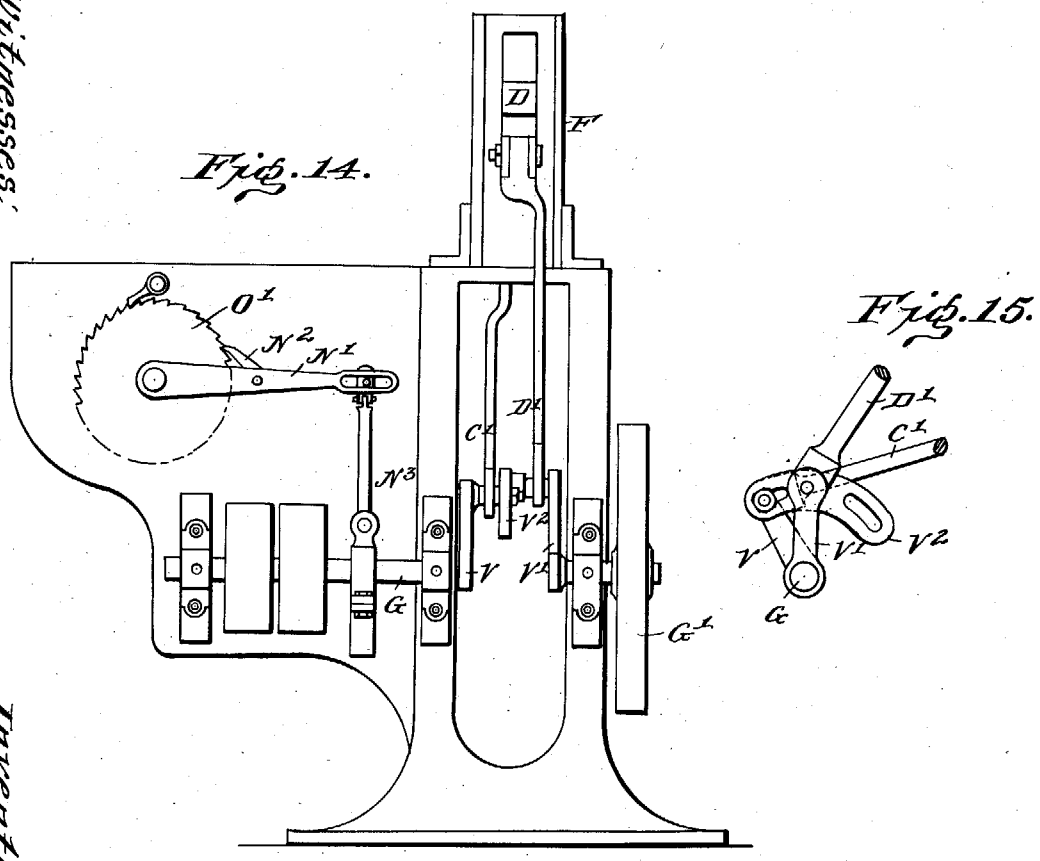
Witnesses:
J. B. Keeler
Bruce S. Elliott
Inventor
Henry Marles
By James L. Norris
Attorney.

No. 11,839. Reissued July 3, 1900.

H. MARLES.

CARVING MACHINE.

(Application filed Dec. 30, 1899.)

6 Sheets—Sheet 6.

Witnesses:

J. B. Kerr

Bruce S. Elliott

Inventor
Henry Marles

By James L. Norris
Attorney

UNITED STATES PATENT OFFICE.

HENRY MARLES, OF LONDON, ENGLAND, ASSIGNOR, BY MESNE ASSIGNMENTS, TO THE MARLES CARVED MOULDING COMPANY, OF WEST VIRGINIA.

CARVING-MACHINE.

SPECIFICATION forming part of Reissued Letters Patent No. 11,839, dated July 3, 1900.

Original No. 616,002, dated December 13, 1898. Application for reissue filed December 30, 1899. Serial No. 742,089.

*To all whom it may concern:*

Be it known that I, HENRY MARLES, a subject of the Queen of Great Britain, residing at London, England, have invented new and useful Improvements in Carving-Machines, of which the following is a specification.

This invention relates to machines for carving repeat ornaments on wood moldings and the like where two sets of reciprocating tools are used—viz., one for incising the contour of the ornament or part of it and another for making a cut meeting the incision at an angle.

My invention consists, first, in improved means for actuating the tool-holder slides, whereby the machine can be driven and maintained at a very much increased speed; secondly, in improved means for feeding the moldings uninterruptedly consecutively through the machine, whereby the machine can be kept continuously running while the attendant merely pushes in one molding after and against the end of the other, so that the daily yield of the machine is greatly increased, and, thirdly, in means for holding the tools, whereby the machine needs only to be stopped while one tool-holder chuck is taken out in order to be replaced by another the tools of which have been meanwhile or previously sharpened without being removed from their chuck; and, furthermore, said invention consists in a carving-machine in which a plurality of carving-tools are held in a reciprocating chuck, in combination with means for feeding the work to or in front of said tool and intermittently temporarily stopping its progress while the carving-tools enter and recede from the same, all so arranged that the carving of a design is performed step by step or progressively, the first tool performing the initial operation and the succeeding tool or tools completing the design. The above improvements thus all tend to enormously increase the yield of the machine and to enable it to be worked by only one attendant.

My invention also provides means for altering the angle at which the tools enter or act on the molding and means for adapting them to moldings of various widths and thicknesses.

Figure 16:
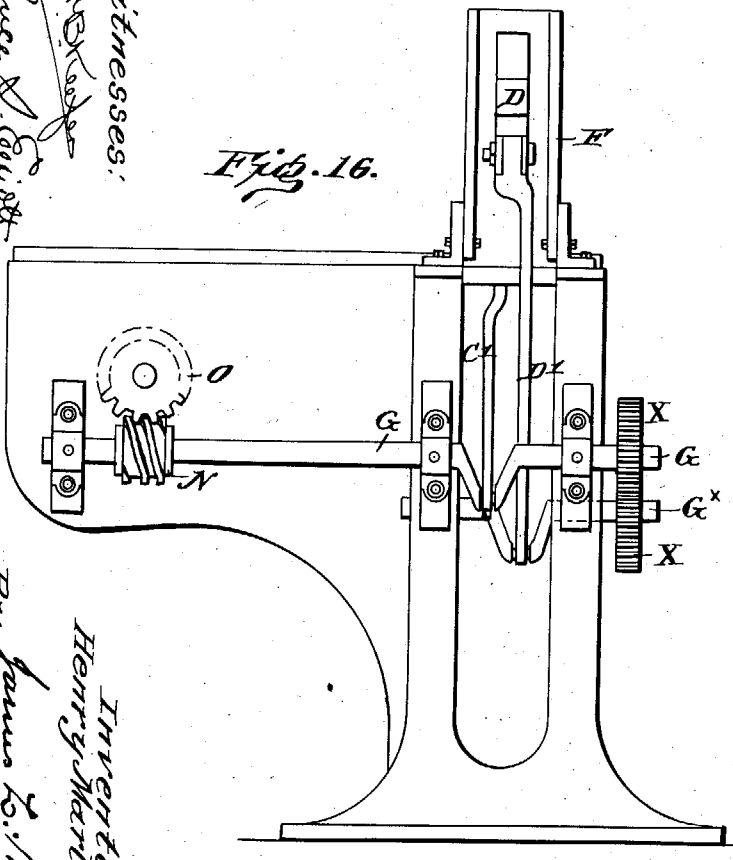

Figure 1 of the drawings is an end view, Fig. 2 a front elevation, Fig. 3 another end view, and Fig. 4 a back elevation, of such a machine adapted to carve or ornament wood moldings. Fig. 5 is a plan view, Fig. 6 a side view, and Fig. 7 a front view, of a tool-chuck. Fig. 8 is a side view of a molding with the incisions made therein by one tool, and Fig. 9 a side view of the molding as it comes finished from the second tool. Fig. 10 is a front view of the outlines of a machine for doing another form of molding ornament, and Fig. 11 a plan view of such a molding. Fig. 12 is an end view of a machine for doing another form of molding ornament, and Fig. 13 a plan view of such a molding. Fig. 14 is a back view in outline of a machine with modified form of tool-reciprocating gear and feed-gear, and Fig. 15 an end view of a double crank thereof. Fig. 16 is a back view in outline of a machine with another modified form of outer reciprocating gear, and Fig. 17 an end view.

Referring now to Figs. 1 to 4, upon the machine-framing A are arranged two tool-chuck-carrying slides C and D. The slide C works in a dovetail guide E′ on the top of the table E, which latter can be shifted in or out and set at various angles as required for the work, because it is fixed adjustably to a bracket A′, bolted or cast onto the frame A by means of screw-bolts $E^2$ passing through slots in the bracket A′. Similarly the slide D works in a dovetail guide F′ on the side of a bracket F, which can be shifted up or down and set at various angles as required for the work, because it is adjustably fixed to a bracket $A^2$, bolted or cast onto the frame A by means of screw-bolts $F^2$ passing through slots in the bracket $A^2$. The slides C and D are reciprocated by the eccentric-rods C′ and D′, which are fitted with sleeves $C^2$ and $D^2$, having right and left hand screw-threads for length adjustment. The eccentrics are on a shaft G, fitted with a fly-wheel G′ and fast and loose belt-pulleys $G^2$ and $G^3$. The eccentrics are preferably arranged, as shown, so that the tools on the respective slides are alternately brought into contact with the molding or other work; but this alternate action is only necessary when the slides and their tools converge toward the same place on the molding, so that when one set of tools has left the molding another set enters it. Two or more cuts thus made at different angles by suitably-shaped converging tools meeting in the wood make and detach chips of the wood and produce the desired pattern.

By reason of the direct connection between the common driving-shaft G and the slides C and D the machine can be worked steadily and economically at a greatly-increased speed, and by reason of the slots in the brackets A and $A^2$ the slides C and D can be bodily shifted horizontally and vertically, thus adapting the machine to moldings of various widths and thicknesses. The molding is guided against a usual adjustable fence, as shown.

The construction of the tool-holding chucks on the slides C and D will be clearly understood by reference to Figs. 5, 6, and 7. The body H of the chuck is formed with a wedge-shaped groove H' along each side and is adjustably held in a longitudinal groove in the slide C (or D) by means of the wedge-shaped clamps I and set-screws I', or the body H might be made of ordinary dovetail shape and the clamps I of a shape to suit. The chuck-body H has upstanding side pieces $H^2$, between which the four tools K K' $K^2$ $K^3$ (or a less or greater number of such) are located, resting, it may be, on packing-pieces L L' $L^2$ $L^3$ and with intermediate blocks, all as required. The tools at their back ends abut against set-screws $K^\times$ in the upstanding flange $H^3$. The tools are held down by set-screws M', tapped in the cross-bars M, which latter are fixed to the side pieces $H^2$ by means of screws $H^4$. The tools are set forward severally by means of the set-screws $K^\times$. The whole chuck, with its tools, is set up to the work by the screw $H^5$, which passes between lugs $C^3$ on the slide C and is adjusted and fixed by nuts $H^6$. The distinguishing feature of this chuck is that it can be removed for sharpening the tools in a quick and convenient manner without disturbing the adjusted position of the tools—that is to say, by merely slackening one of the nuts $H^6$ and screwing back two set-screws I' on the same side; but it is usually more advantageous to employ duplicate chucks with tools, so that when the tools in one chuck have lost their sharp cutting edges the entire chuck may be removed and replaced by the duplicate one having tools already sharpened, so that no time is lost, especially if the exchange of chucks is made during the dinner-hour.

Another distinguishing and very important feature of the chuck is that the series of carving-tools contained therein are arranged in succession in the line of feed of the work and may be variously arranged and adjusted with respect to each other for the purpose of accomplishing the carving of designs of different character, in carving which the tools are accurately set and held so that they successively perform their progressive and successive duties on the work.

Fig. 8 shows, as an example, a wood molding T, into which one set of tools has made vertical incisions of the form shown in dotted lines, and Fig. 9 shows in plan the finished molding after the second operation, consisting of the horizontal scooping out of hollows that at the back terminate with the aforesaid vertical incision.

In Fig. 7 I have, as an example, shown two tools—viz., K and $K^2$—so set as to scoop out a first chip, and the tools K' and $K^3$ following on for deepening the notches by scooping out next a second chip, the molding being fed along at the rate of the distance from center to center of the tools and intermittently stopped in front of the tools, while the latter enter and recede therefrom. As will be seen, the work is fed repeatedly or intermittently forward—that is, during its progress through the machine its direction is not reversed, but is merely temporarily stopped at intervals—and the work is stopped at intervals of its feed corresponding to the distance between the centers of the several tools which act thereon, so that the first tool of the chuck enters and performs its portion of the carving of the design. The work is then fed a distance equal to that between the center of the first tool and the center of the second and then stopped. At this point the said first tool performs its operation upon a succeeding design and the second tool carves its portion or performs its step in carving the design which was immediately before acted on by the said first tool. This operation is further carried on successively if there be more than two tools in the series employed in effecting the design, and this progressive operation is effected by both chucks when the two are employed operating at angles, as illustrated in the drawings.

The uninterruptedly-consecutive feeding on of the moldings is effected by intermittently-rotating gripping-rollers acting against the under side of the molding, while said molding is held down by a spring-actuated pad or roller. The machine continues to work all the time, and all that the attendant practically has to do is to push in a fresh molding when the one that at the time being is fed through the machine has almost passed through the feed-rollers, because the fresh molding being pushed into the grip of the feed-rollers will push the yet remaining length of the other molding through the machine while this length is held properly down by the aforesaid spring-actuated pad or roller. The intermittent rotation of the feed-rollers may be effected by any suitable well-known means; but for giving a soft and noiseless motion with a machine running at a very high speed I prefer the means shown in Fig. 4—viz., by an irregular worm N on the shaft G, said worm having part of its thread straight—that is to say, running in a plane perpendicular to the axis of the shaft—and the other part being pitched helically or obliquely thereon. Thus when rotating the right-angled part of the thread in passing between the teeth of the worm-wheel O holds the same stationary; but when the pitched part of the thread is passing between the said teeth the worm-wheel is caused to rotate, the worm being so arranged on the driving-shaft G that its pitched or operative part takes effect only when the tools are out of the wood. By this means I insure a soft intermittent motion of the worm-wheel O. The change-wheels $O^2$ and $O^3$ transmit motion intermittently to the spindle $O^4$, which by a tooth-wheel in gear with tooth-wheels on the feed-wheel spindles P P, as shown in Fig. 2, rotate the feed-wheels P′ P′, fixed thereon. These latter are formed with teeth or otherwise roughened sufficiently to hold the molding or propel it forward when required. The feed-roller shafts P P rotate in the same direction, being connected by a spur-wheel on each and another spur-wheel intermediate thereto, but not shown on the drawings.

Q Q are upper rollers which are held down against the molding by a weight Q′, suspended by a cord $Q^2$ from levers $Q^3$ $Q^3$, having their fulcrum in standards $A^3$ $A^3$ on the frame and jointed to yokes $Q^4$ $Q^4$, wherein the spindles of the rollers Q Q have their bearings. In order to hold down the molding while being operated upon, I provide flat springs R R, having wooden pads or rollers R′ R′ at their bottom ends. The springs are adjustable in the socket-brackets $A^4$ $A^4$, which are fixed to the bracket F on the machine-frame.

The slides and tools, as hereinbefore described, may be further supplemented by additional tools, such as chisels or cutters, attached to suitably-shaped levers and connecting-arms adjustably pivoted to the bed or body of the machine or to either of the aforesaid slide arms or brackets in such a way as to be operated by either of the reciprocating slides.

Fig. 10 illustrates one example where, for instance, a curved cutting action is required, as in the case of a molding T′. (Shown in plan in Fig. 11.) A cutting-tool $K^4$ is attached to one end of a double-armed lever S, having its fulcrum on one of the brackets $A^2$ on the frame A of the machine, (here only shown in bare outline,) such bracket being for the purpose carried up higher. The lever S is reciprocated by being connected to the slide D by the rod S′. The slanting chipping action on the molding is performed by the tool $K^4$ after a vertical half-round incision has been made by a tool on the slide D.

Fig. 12 shows an arrangement for the case where a curved or convex cutting action is required, as in the case of the egg-and-tongue pattern shown on the molding $T^2$, Fig. 13. For this purpose a suitable cutter $K^5$ (or cutters) is attached to a curved slide U, which is made to work to and fro in a curved recess of a bracket U′, attached to the frame A of the machine. For this purpose the slide U is connected by the rod $U^2$ to the slide C, (or it might be to the vertical slide D,) or the slide U may be worked direct from the driving-shaft by the eccentric and rod or the like.

Fig. 14 shows a modification of the worm and worm-wheel-feed arrangement described. For the worm-wheel is substituted a ratchet-wheel O′ with pawl-lever N′ and $N^2$, the pawl-lever being reciprocated by an eccentric-rod $N^3$ from an eccentric on the driving-shaft G. In this case I have also, as an example, shown the shaft G fitted with two cranks V and V′, which are connected by a link $V^2$, provided with slots for relative adjustment of the two cranks. C′ and D′ are the connecting-rods for actuating the aforesaid slides C and D of the machine described with reference to Figs. 1 to 4.

Figs. 16 and 17 show an arrangement of one crank on the driving-shaft G and another crank on a shaft $G^X$, which is driven from the former by the tooth-wheels X X.

It must be understood that I do not bind myself to the particular means here shown for driving the tool-slides C and D. Thus, for instance, in the machine shown in Figs. 1 to 4 the slides may be driven from eccentrics on two separate shafts geared together by means of tooth-wheels. Any number of such slides may be arranged in one machine, according to the requirements of different designs of moldings.

Any well-known means, such as a fan or rotary brushes, may be used for removing the chips or for cleaning the molding in front of the tools.

I claim—

1. A machine for carving wood moldings or the like, consisting of a frame, a bracket angularly adjustable thereon in a more or less upright position, a bracket angularly adjustable thereon in a more or less horizontal position, said brackets having guides lengthwise thereon, slides adapted to work along said guides, a tool-holding device adjustable on each slide, means for reciprocating the slides, and means for intermittently holding the molding and feeding it through the machine, substantially as set forth.

2. In a machine for carving wood moldings or the like, the combination of a frame, two brackets angularly adjustable toward each other in a vertical plane on the frame, and having guides lengthwise thereon, a slide adapted to slide on each bracket and provided with adjustable tool-holder and tools for making a cut into the molding, which cuts meet at an angle, means for reciprocating the slides, upper and lower rollers between which the molding is intermittently held and fed into the machine, and elastic means for holding down the molding, substantially as and for the purpose set forth.

3. In a machine for carving wood moldings or the like, the combination of a frame, two brackets angularly adjustable toward each other on the frame in a vertical plane and having guides lenghtwise thereon, a slide adapted to slide on each bracket and provided with adjustable tool-holder and tools for making a cut into the molding, which cuts meet at an angle, a shaft rotating in bearings on the frame, means thereon in combination with connecting-rods for reciprocating the slides, said rods provided with means for length adjustment to suit varying positions of the brackets, means for intermittently feeding the molding through the machine, and elastic means for holding down the molding, substantially as set forth.

4. In a machine for carving wood moldings or the like, the combination with the tool-holders, tools secured thereto and coöperating in the work, means for adjusting said tool-holders in different planes, and means for reciprocating the same; of two smooth upper weighted rollers acting on the top of the molding, two lower rollers geared together and provided with toothed or roughened surfaces acting on the bottom of the molding, toothed change-wheels for causing the lower rollers to be positively rotated, a worm-wheel for operating the said tooth change-wheels, a worm with part straight and part helical thread for intermittently rotating the worm-wheel, a presser-pad on either side of the tool-holders, springs for holding said pads elastically against the molding and means for guiding the latter to and from the tools, substantially as and for the purpose set forth.

5. In a machine for carving wood moldings or the like, the combination of a reciprocated slide, a tool-holding chuck formed with V-grooves on two opposite sides, V-pieces adapted to said grooves, cheeks on the slide and set-screws therein for adjusting and fixing the V-pieces in the desired position, said chuck formed with a recess for receiving the tools, transverse clamping-bars and set-screws therein for holding down the tools in the recess when they have been adjusted in position, a transverse flange on the chuck and set-screws passing therethrough for setting the tools severally up to the work, a lug on the slide and a set-screw passing therethrough and attached to the chuck and having nuts for pushing forward or drawing back the entire chucks with the tools fixed and adjusted therein, said chuck being removable bodily for sharpening the tools by merely loosening one of the last-named nuts and by setting back one of the V-pieces, substantially as set forth.

6. A machine for carving wood moldings or the like, consisting of a frame, a bracket angularly adjustable thereon in a more or less upright position, a bracket angularly adjustable thereon in a more or less horizontal position, said brackets having guides lengthwise thereon, slides adapted to work along the said guides, a part-circular guide on the frame, a part-circular slide adapted to work in said guide and having a connection to the horizontal slide, tool-holding devices adjustable on each of the three slides, a shaft rotating in bearings on the frame, means thereon in combination with connecting-rods for reciprocating the first-named slide or the secondly-named slide with its part-circular slide, and means for intermittently holding the wood and feeding it through the machine, substantially as set forth.

7. In a machine for carving wood moldings or the like, the combination of the frame, the table E adjustable on the frame toward and from the work and angularly relatively thereto, the bracket F adjustable on said frame vertically toward and from the work and angularly relatively thereto, said table and bracket having guides lengthwise thereon, slides adapted to work along said guides, a tool-holding device adjustable on each slide, means for reciprocating the slides, and means for intermittently holding the molding and feeding it through the machine, substantially as set forth.

8. In a machine for carving wood moldings or the like, the combination with the main frame, a vertical and a horizontal bracket adjustable angularly on said frame, tool-holders connected with and having motion on said brackets and means for reciprocating the tool-holders; of an auxiliary tool-holder oscillating in a plane angular relatively to the plane of motion of one of the first-named tool-holders, and means for oscillating the auxiliary tool-holder, for the purpose set forth.

9. In a machine for carving wood moldings or the like, the combination with the main frame, a vertical and a horizontal bracket adjustable angularly on said frame, tool-holders connected with and having motion on said brackets and means for reciprocating said tool-holders; of an auxiliary tool-holder fulcrumed to oscillate on one of the aforesaid brackets and connected with and oscillated by the tool-holder thereon, for the purpose set forth.

10. A machine for carving wood moldings or the like, consisting of a frame, a bracket angularly adjustable thereon in a more or less vertical position, a second bracket angularly adjustable on said frame in a more or less horizontal position, tool-carriers having sliding motion in said brackets, and means for reciprocating the tool-carriers, for the purpose set forth.

11. The combination of a series of tools arranged in succession in the line of feed of the work, and means for reciprocating the tools of said series simultaneously, of means for repeatedly feeding the work for each reciprocation of the series of tools a distance equal to that between the centers of adjacent tools, said tools being shaped to form a portion of a complete design resulting from the coöperation of all the tools.

12. In a carving-machine, the combination with a reciprocating chuck, of a plurality of carving-tools carried thereby, and arranged in succession in the line of feed of the work and means for feeding the material to be carved a distance equal to that between the centers of adjacent tools and intermittently stopping it for the action of the carving-tools, all constructed and arranged so that the tools act successively and progressively to produce the design upon the material to be carved, substantially as described.

In testimony whereof I have hereunto set my hand in presence of two subscribing witnesses.

HENRY MARLES.

Witnesses:
HERBERT SELLEY,
ROBERT SELTH.